April 16, 1963  C. W. MOSSBERG  3,085,453
METHOD OF PREFORMING A COOLANT TYPE DRILL
Filed May 27, 1960　　　　　　　　　　　　　　　2 Sheets-Sheet 2

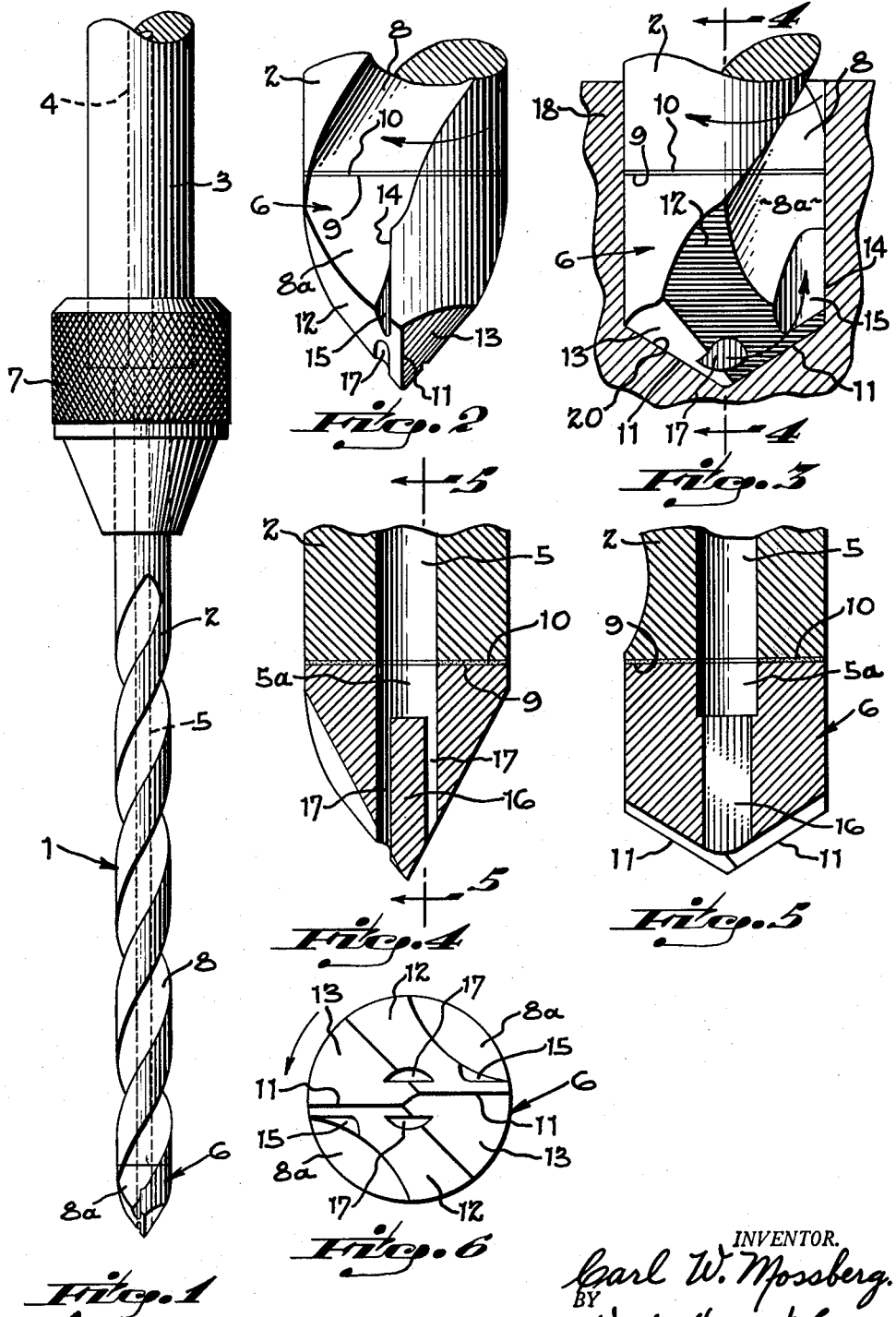

INVENTOR.
Carl W. Mossberg
BY
Wood, Herron & Evans.
ATTORNEYS 3,085,453
METHOD OF PREFORMING A COOLANT TYPE DRILL
Carl W. Mossberg, 6514 Hamilton Ave., Apt. 1, Cincinnati, Ohio
Filed May 27, 1960, Ser. No. 32,377
2 Claims. (Cl. 76—108)

This invention relates to drilling or boring tools of the type sometimes called "oil hole drills," that is, drills which have passageways for conducting liquid coolant to the cutting end as the rotating drill penetrates the work so as to lubricate and cool the cutting edges.

A tool of this kind, which is intended for boring holes in materials which are extremely resistant to drilling is disclosed in my prior Patent No. 2,817,983 to which attention is invited. The patent is directed to a drill which comprises a shank having an axial coolant bore extending to its cutting end, with a hard cutting bit or insert mounted in a slot extending crosswise of the axial bore, so as to delineate two coolant nozzles arranged to project flow streams of liquid coolant along the cutting edges and work surface during the drilling operation. In fabricating the drill according to the patent, the insert is secured in the slotted end of the tubular shank by brazing, silver soldering or the like, then the end portion of the shank or drill rod is machined to a cone-shape, so as to form cutting edges at the end and the sides of the bit or insert. The flow streams of liquid coolant not only cool and lubricate the cutting edges but also carry away the cuttings as they are formed, so as to greatly increase the efficiency and cutting capacity of the drill.

One of the primary objectives of the present invention has been to provide a method of manufacture of a drill which is similar to the patented structure, in which the cutting end or tip is in the form of a preformed, one-piece unit, such as a casting or sintered piece, which is shaped to provide the cutting edges, coolant bore, coolant nozzles and other features, the preformed drill end or tip adapted to be mounted directly on the working end of a drill shank having an axial coolant bore which registers with the bore of the insert.

By the present method of forming the drill end or insert as a one-piece solid element mounted on the shank, the machining of the cross slot, the silver soldering of the insert in the slot, and the machining of the working end of the tool is eliminated, thereby bringing about a substantial decrease in the cost of manufacturing the drills. Moreover, the formed tip piece has improved wearing qualities since the entire working end of the drill is formed of a selected material which has the desired wear resistant properties throughout its mass.

Another objective of the invention has been to provide a method of making a drill wherein the tip may be replaced in a simple convenient manner in the event it becomes worn after prolonged service. According to this aspect of the invention, the prefabricated tip may be provided with a flat upper end which is silver soldered, brazed or otherwise bonded to the flat lower end of a drill shank. In this instance, the worn tip may be demounted by heating the working end of the drill to a temperature sufficiently high to melt the bonding material, then a new preformed tip piece may immediately be bonded in place. In a modified form of the invention, the replaceable tip may be provided with a keyed connection with the end of the shank, such that the key transmits the driving torque to the tip. In another form of the invention, the upper end of the preformed tip piece may include a threaded connection with the end portion of the shank to facilitate replacement without the use of a bonding agent.

It will be understood that in some instances, the entire drill may be fabricated as a one-piece element formed by the casting or sintering process. However, for the sake of economy, and also to provide a shank having the desired physical properties of toughness and resistance to breakage, it is of advantage in most cases to fabricate the tip piece as a separate unit by the casting or sintering process so that the worn tool can be reconditioned by replacing the tip instead of by grinding the worn cutting end.

In practicing the invention, the preformed tip piece may be fabricated from various materials, such as carbide, high speed steel, and in some instances, from ceramic materials, according to the intended use of the drill. The shape may be imparted to the piece by die casting, by forging, or by the powder metallurgy technique, depending somewhat upon the character of the material from which the tip piece is made.

Modern casting methods make it possible to produce the shaped tip piece in substantially finished condition ready to be mounted on the shank with little or no machining. In working other metals, for example, carbide, the powder metallurgy technique may be preferable, the part being preformed from the powdered carbide or other metal under pressure in a suitable die set, then sintered or coalesced at the required temperature in a treating furnace or the like. In this process, the shape is likewise substantially finished and ready for mounting after having been sintered. The preforming and firing process, generally similar to the powdered metal technique, is also followed in fabricating the tip pieces from ceramic materials.

The drill of the present invention provides the same advantages as the structure disclosed in the aforesaid patent and can be fabricated to any desired length, utilizinz a steel shank made from tubular stock having an axial coolant bore. The structure is particularly intended for deep boring of materials which, by their very nature, cause the rotating drill to generate a great deal of heat, ordinarily resulting in rapid deterioration or outright destruction of the tool. As the drill penetrates the work, coolant is projected under pressure through the axial bore of the rotating drill and issues from a pair of nozzles located on opposite sides of the cutting edge near the central axis of the axis of the tip. From the nozzles, the coolant flows along the working faces and cutting edges and across the critical cutting zone at the inner end of the bore hole, then flows upwardly into the flutes which communicate with the working faces at the cutting end. The coolant streams thereby flush away the chips or cuttings as they are formed, thereby to keep the bore hole clean to create the most efficient cutting action by virtue of the cooling and lubricating effect of the coolant.

The various features and advantages of the present invention will be more fully apparent to those skilled in the art from the following detailed description taken in conjunction with the drawings.

In the drawings:

FIGURE 1 is a fragmentary side elevation illustrating a drill of the present invention mounted in the spindle of a machine tool of the type arranged to supply liquid coolant under pressure to the cutting end of the drill.

FIGURE 2 is an enlarged fragmentary side view detailing the one-piece tip or insert of the drill.

FIGURE 3 is a side view projected from FIGURE 2, showing the tool in working position within a bore hole.

FIGURE 4 is a sectional view taken along line 4—4 of FIGURE 3, further detailing the drill structure.

FIGURE 5 is a sectional view taken along line 5—5 of FIGURE 4.

FIGURE 6 is an end view of the cutting tip as projected from FIGURE 4.

Figure 7:
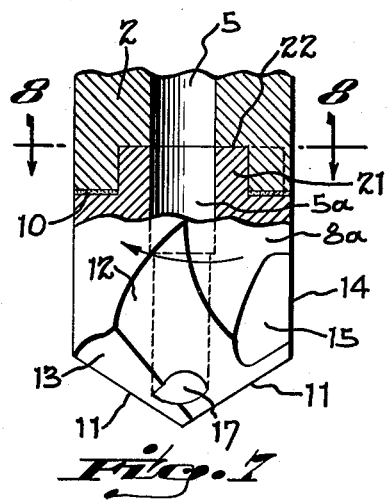
FIGURE 7 is a fragmentary side view, similar to FIGURE 3, but showing a slightly modified structure wherein the replaceable cutting tip is provided with a key which interfits the end of the tool shank.

Described with reference to FIGURE 1, the drill of the present invention, which is indicated generally at 1, includes a shank 2 mounted in the spindle 3 of a drill press or other suitable machine tool, the spindle being provided with an axial coolant bore 4 for feeding the liquid coolant under pressure to the axial coolant bore 5 of the drill shank for advancement to the cutting tip or insert, indicated generally at 6. It will be understood that the drill is intended for general utility either in machines having a rotating spindle for driving the drill, or in machines of the type wherein the drill is mounted in a stationary element while the work is rotated and fed axially with respect to the drill. The spindle 3 therefore represents the tool-mounting element of either type of machine tool.

In its utility in the upright drilling machine partially shown, the upper end of the rotary spindle 3 is provided with a packing gland or transfer unit (not shown) which is interconnected with a coolant pump and arranged to force liquid coolant through the bore 4 to the lower end of the spindle and through bore 5 of the drilling tool. The gland is in communication with the pump through a flexible conduit to permit the rotating spindle to be fed axially during the drilling operation. In other instances, the transfer unit or gland may be mounted on the lower portion of the spindle adjacent the chuck.

The upper portion of the drill shank 2 is secured to the spindle 3 by means of a chuck 7 of conventional design, the details being omitted from the drawings for this reason. The chuck secures the shank 2 firmly in axial alignment with the spindle and also provides a fluid tight coupling between the spindle and drill shank, adapting the coolant under pressure to be forced without leakage from the lower end of the spindle into the upper end of the drill shank to flow under pressure from the working end of the drill.

In the present disclosure, the drill 1, which has been selected to illustrate the principles of the invention, is known as a "twist drill," the shank being provided with a pair of flutes 8—8 which spiral upwardly from the cutting tip 6 in the cutting direction of rotation, the flutes providing for the discharge of metal cuttings and liquid coolant from the bore hole during the drilling operation. The flutes (FIGURE 6) have a curved profile as viewed from the end of the drill, and are located symmetrically on opposite sides of the shank. In other embodiments of the invention however, the flutes may be made straight, that is, parallel with the axis of the shank and may be located at one or both sides of the shank 2 in accordance with the intended utility of the drill. The tool shank 2 is fabricated from an appropriate grade of steel, which may be heat treated to provide the desired properties, and having a coolant bore approximately one-third the diameter of the shank. The drill is furnished in the various commercial sizes, and the diameter of the coolant bore preferably varies with the diameter of the tool in the proportion indicated above.

The cutting tip 6, as noted above, is formed of suitable material which is a great deal harder than the shank 2, adapting the tool, in the presence of the liquid coolant, to bore holes in workpieces which are extremely hard, or which are otherwise resistant to drilling operations, or which generate excessive heat as a consequence of the cutting action of the drill. The tip 6 may be fabricated from various materials as dictated by the intended use of the tool. By way of example, for drilling a given type of hard material, the tip may be formed of carbide, Stellite or high speed steel, and in other instances, it may be formed from ceramic materials.

Most of these metals can be shaped by the use of dies, such as by the die casting or forging process; in some instances, for example, in shaping carbide, the powder metallurgy technique is preferable. In the power metallurgy process, powder formed from a single metal may be utilized, or the powder may consist of a mixture of metals or alloys, the powder being preformed under pressure and subsequently heated to produce a sintered mass. After being sintered or coalesced, the tip piece may be ready for use, or some minor machining operations may be desirable or necessary before the tip is used. Similarly, when the tip is formed by die casting, forging or the like, it is substantially complete and finished as it issues from the die.

When the tip piece is fabricated from powdered metal such as carbide, the powder is placed in a die having a cavity which determines the external shape of the tip. A punch interfits the cavity within close tolerances, the surfaces of the punch and die having smooth finishes to permit movement of the metallic powder without undue resistance during the pressing stroke. The die preferably is mounted upon the stationary bed or platen of a power press, while the plunger or plungers are mounted upon the reciprocating ram of the press.

In order to form the internal coolant bore and coolant nozzles, which extend through the tip to its cutting end, the die cavity includes a core element suitable to form these passageways during the pressing operation. In a preferred set-up, the core element may project upwardly into the cavity from beneath, while the punch passes into the cavity from above, the powdered metal being fed into the cavity when the punch is elevated to its upper position.

During the punching stroke, the powdered metal is compacted under heavy pressure by the descending punch, causing the metal powder to move somewhat as a highly viscous liquid which is forced under pressure in all directions against the surfaces of the die cavity and core element so as to produce a preformed briquette corresponding precisely to the shape of the die cavity, with internal passageways corresponding to the shape of the core element. After the pressing operation is completed, the formed tip piece is forced from the die cavity by a suitable ejector, the cavity preferably having a slight draft or taper which increases the diameter of the cavity in the ejecting direction.

After being ejected, the tip is sintered in a suitable furnace and may be heat treated if necessary, to bring out the desired properties in the metal; after these operations, the tip may be mounted on the end of the shank 2. In the form of the invention shown in FIGURES 1–6, the tip has a flat upper end 9, which is attached to the flat end of the shank by a silver soldering or brazing operation as indicated at 10.

Tips fabricated from other alloys or from ceramic materials are preformed substantially the same way; however, the treating or firing temperatures, as the case may be, will be varied according to the requirements of the various materials.

As viewed in FIGURES 2 and 3, the tip 6 is generally cylindrical, having a diameter equal to or slightly greater than the shank 2, the cutting end being generally cone-shaped and having end cutting edges 11—11. The cutting edges 11 are delineated by the downwardly inclined working faces 12—12 which reside on the leading side of the cutting edges, in the direction of rotation, as indicated by the arrow. It will be noted in FIGURE 4, that the working faces lead directly to the lower end of the spiral flutes 8a of the tip piece, which register with the flutes 8 of the shank.

On the trailing side of each cutting edge there is provided a flat or heel 13 which tapers downwardly to the cutting edge, thus providing a relief or clearance angle on the trailing side of the cutting edges. The cutting angle of the working face 12, on the leading side of the cutting edge provides a negative rake which creates a chip breaking action, reducing the cuttings to small particle size which may be readily flushed from the end of the bore hole upwardly through the flutes with the coolant.

As viewed in FIGURE 3, the cutting edges 11—11 are angularly related so as to generate a cone-shaped bore end, and their outer edges lead to respective side cutting edges 14—14 which act upon the periphery of the hole as the drilling tool is fed in. The tip is provided with side working faces 15—15 on the leading face of the side cutting edges 14, the side working faces 15 being formed in the surface of the flute 8a of the tip piece. The side cutting edges 14 may extend outwardly slightly beyond the periphery of the shank to provide a slight amount of hole clearance for the drill. As noted above, the end working faces 12 also break into the flute 8a; hence, the cuttings or borings which are severed by the end and side cutting edges may be flushed upwardly from the cutting zone directly into the flutes for discharge with the coolant from the upper end of the hole.

Referring to FIGURES 4 and 5, the tip is provided with an axial bore 5a which registers with the bore 5 of the shank. The bore 5a is bisected by an integral metal section 16, which delineates the restricted coolant nozzles 17—17 located on opposite sides of the end cutting edges 11—11. The nozzles 17 break through the working faces 12—12 on opposite sides of the axis of the tip so as to project the liquid coolant radially in advance of the cutting edges and upwardly to the flutes during the cutting operation, generally as indicated by the arrow in FIGURE 3. It will be noted in this view that as the drill penetrates the work 18, the end 20 and the adjacent periphery of the bore hole, in which the tip is working, converts the working faces 12 into closed passageways which cause the coolant to flow across the cutting edges and work surface in the cutting zone, then directly into the flutes. It will also be noted that this arrangement avoids the use of small apertures and the attendant likelihood of clogging, which is always a problem with drills involving the use of small coolant jet apertures. The nozzles 17 in combination with the working faces and hole surfaces, thus provide velocity flow streams of coolant across the critical cutting zone, such that the chips are carried away as fast as they are formed. The coolant streams also keep the cutting edges and adjacent portions of the tip at a safe operating temperature, and through immediate removal of the chips, maintain maximum cutting efficiency under the most severe operating conditions. This action is of special significance in drilling materials which cause rapid heating and consequent deterioration or outright destruction of conventional drills.

During the drilling operation, the drill is fed into the work at a rate consistent with the type of material, while coolant is forced in under sufficient pressure to project the jet streams across the cutting edges and passageways which lead to the flutes. The coolant streams, with the cuttings entrained therein, pass up the flutes at a velocity which is sufficiently high to carry the particles in suspension until the flow streams reach the outer end of the hole. At this point, the mixture of coolant and cuttings may be collected and recirculated through the pump, the cuttings first being screened or otherwise separated from the coolant.

In mounting the tip, a locating rod may be interfitted with the bore 5 of the shank and used as a dowel pin which enters the bore 5a of the tip. After the silver soldering or brazing operation, the rod is removed from the upper end of the shank. As the top becomes worn through prolonged hard usage, it may be removed by fusing the silver solder joint so that a new tip may be applied to the same shank.

Figure 8:
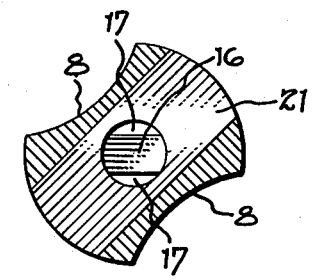
FIGURE 8 is a sectional view taken along line 8—8 of FIGURE 7, further illustrating the driving key of the cutting tip.

In certain instances, for example, where a high torque is imposed upon the drill tip, it may be provided with a key 21 (FIGURES 7 and 8) which interfits a corresponding key way 22 formed in the lower end of the shank and extending transversely to the axis of the tool between the flutes 8. In this modification, the tip may also be located for soldering by the use of a rod inserted through the coolant bore of the shank. The tip or insert is secured in place by a silver solder joint 10 which, if desired, may be extended across the key way surfaces.

Figure 9:
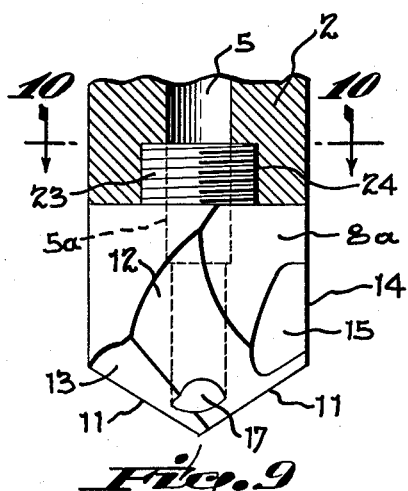
FIGURE 9 is a fragmentary view similar to FIGURE 7, but showing a further modification in which the replaceable cutting tip is provided with a screw threaded stud for attachment to the tool shank.
Figure 10:
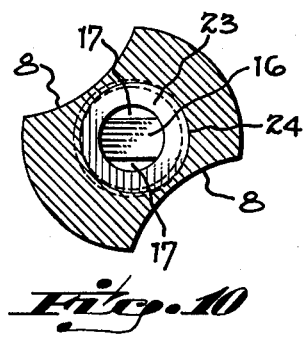
FIGURE 10 is a sectional view taken along line 10—10 of FIGURE 9, further detailing the screw threaded tip piece.

In the modification shown in FIGURES 9 and 10, the bit is provided with a threaded stud 23 which interfits a threaded counter bore 24 machined into the lower end of the shank. The threaded stud 23 is molded as an integral part of the tip by the sintering or casting procedures noted above. If necessary, the threads may be chased to a final finish with a suitable grinding wheel after they are preformed in the die set. The lead of the screw threads is such that the tip is tightened during rotation in the drilling operation. The threaded stud is particularly intended for tools wherein the amount of wear is rapid and where frequent replacement of the tips is involved.

Having described my invention, I claim:

1. The method of fabricating a rotary drill for boring a hole in a workpiece while supplying liquid coolant to the cutting zone in the end portion of the hole, said method comprising the steps of providing a generally cylindrical drill shank having an axial coolant bore extending therethrough and having a pair of concave flutes formed on opposite sides thereof, molding a generally cylindrical one-piece cutting tip in a die set, said tip having a cone-shaped cutting end including cutting edges, placing in the die set before the molding operation a core element having a cylindrical portion and a pair of branch portions which are chordal in cross section, said chordal portions having flat sections spaced apart from one another in substantially parallel relationship, said core element adapted to form an axial coolant bore including a pair of coolant nozzles communicating with said bore and straddling said cutting edges, said pair of coolant nozzles being generally chordal in cross section, removing said core element from the cutting tip after molding the same in said die set, whereby said coolant nozzles have open ends on opposite sides of said cutting edges, forming a pair of concave flutes on opposite sides of said tip communicating with said cutting edges, locating the one-piece cutting tip on the working end of the shank with the bore of said tip in alignment with the bore of the shank and with the concave flutes of the cutting tip aligned with the flutes of the drill shank, and attaching said tip to the working end of the shank, whereby during a drilling operation, said coolant nozzles are presented to the end surface of said bore hole above the cutting edges thereby converting said cone-shaped cutting tip into closed coolant passageways for projecting streams of coolant across said cutting edges.

2. The method of fabricating a rotary drill for boring a hole in a workpiece while supplying liquid coolant to the cutting zone in the end portion of the hole, said method comprising the steps of providing a generally cylindrical drill shank having an axial coolant bore extending therethrough and having a pair of concave flutes formed on opposite sides thereof, molding a generally cylindrical one-piece cutting tip in a die set, said tip having a cone-shaped cutting end including cutting edges, placing in the die set before the molding operation a core element including a cylindrical portion and a pair of branch portions which are chordal in cross section, said chordal portions having flat sections spaced apart from one another in substantially parallel relationship, said core element adapted to form an axial coolant bore including a pair of coolant nozzles communicating with said bore and straddling said cutting edges, said pair of coolant nozzles being generally chordal in cross section, removing said core element from the cutting tip after molding the same in said die set, whereby said coolant nozzles have open ends on opposite sides of said cutting edges, forming a pair of concave flutes on opposite sides of said tip communicating with said cutting edges, inserting a locating rod in the axial coolant bore of said shank and tip and thereby locating said bores in axial alignment with one another, locating the concave flutes of the cutting tip in alignment with the flutes of the drill shank, attaching said tip to the outer end of the shank, and removing said locating rod from the axial bore of the shank, said drill adapted to form a cone-shaped end surface in the bore hole of a workpiece during a drilling operation, said coolant nozzles being presented to the end of said bore hole above the cutting edges and converting said cone-shaped end into closed coolant passageways for projecting streams of coolant across the said cutting edges.

References Cited in the file of this patent

UNITED STATES PATENTS

| | | |
|---|---|---|
| 1,104,989 | Hanson | July 28, 1914 |
| 2,237,901 | Chun | Apr. 8, 1941 |
| 2,267,868 | Laval et al. | Dec. 30, 1941 |
| 2,817,983 | Mossberg | Dec. 31, 1957 |
| 2,895,355 | Kleine | July 21, 1959 |